US 8,848,985 B2

(12) United States Patent
Inoue et al.

(10) Patent No.: US 8,848,985 B2
(45) Date of Patent: Sep. 30, 2014

(54) FACE-IMAGE REGISTRATION DEVICE, FACE-IMAGE REGISTRATION METHOD, FACE-IMAGE REGISTRATION PROGRAM, AND STORAGE MEDIUM

(75) Inventors: Tomohiro Inoue, Kyoto (JP); Masahiro Senga, Kyoto (JP); Takashi Kakiuchi, Kyoto (JP)

(73) Assignee: OMRON Corporation, Kyoto (JP)

(*) Notice: Subject to any disclaimer, the term of this patent is extended or adjusted under 35 U.S.C. 154(b) by 1015 days.

(21) Appl. No.: 12/282,631

(22) PCT Filed: Mar. 14, 2007

(86) PCT No.: PCT/JP2007/055125
§ 371 (c)(1),
(2), (4) Date: Sep. 11, 2008

(87) PCT Pub. No.: WO2007/105768
PCT Pub. Date: Sep. 20, 2007

(65) Prior Publication Data
US 2009/0060295 A1    Mar. 5, 2009

(30) Foreign Application Priority Data
Mar. 15, 2006   (JP) ................................ 2006-071851

(51) Int. Cl.
*G06K 9/00*   (2006.01)
*G06F 17/30*  (2006.01)
*G06K 9/62*   (2006.01)

(52) U.S. Cl.
CPC ...... *G06K 9/00288* (2013.01); *G06F 17/30247* (2013.01); *G06K 9/6255* (2013.01)
USPC ........................................................ 382/118

(58) Field of Classification Search
CPC .......... G06K 9/00248; G06K 9/00281; G06K 9/00288; G06K 9/00295; G06T 2207/30201
USPC .................................................. 382/115–119
See application file for complete search history.

(56) References Cited

U.S. PATENT DOCUMENTS

| 7,587,068 | B1 * | 9/2009 | Steinberg et al. | ............. 382/118 |
| 2003/0039380 | A1 * | 2/2003 | Sukegawa et al. | ............ 382/118 |
| 2005/0259959 | A1 | 11/2005 | Nagao et al. | |

FOREIGN PATENT DOCUMENTS

| JP | 06-259534 | 9/1994 |
| JP | 10-232934 | 9/1998 |

(Continued)

OTHER PUBLICATIONS

International Search Report dated Apr. 10, 2007 issued in PCT/JP2007-055125, 5 pages.

(Continued)

*Primary Examiner* — Amir Alavi
*Assistant Examiner* — Kenny Cese
(74) *Attorney, Agent, or Firm* — Osha Liang LLP

(57) ABSTRACT

A face-image registration device extracts, from a moving image which is inputted thereto, a face image showing a face of a person and registers the face image in a dictionary. The face-image registration device includes representative-face-image extracting means for extracting, from the moving image, at least one face image which satisfies a predetermined representative condition, so as to obtain a representative face image, and registration-face-image extracting means for extracting, from the moving image, at least one face image which shows the person shown in the representative face image but is not the representative face image and which satisfies a predetermined registration condition, so as to obtain a registration face image. The face-image registration device also includes face-image registration means for registering, in the dictionary, the registration face image in association with the representative face image.

10 Claims, 10 Drawing Sheets

(56) References Cited

FOREIGN PATENT DOCUMENTS

| JP | 10-257436 A | 9/1998 |
|---|---|---|
| JP | 11-167632 | 6/1999 |
| JP | 2001-167110 | 6/2001 |
| JP | 2002-133423 | 5/2002 |
| JP | 2002-269563 | 9/2002 |
| JP | 2005-101906 A | 4/2005 |
| JP | 2005-107867 A | 4/2005 |
| JP | 2005-115481 | 4/2005 |
| JP | 2005-333381 A | 12/2005 |
| JP | 2006-031387 | 2/2006 |

OTHER PUBLICATIONS

Supplementary European Search Report issued in European Application No. 07738595.3-1224 dated Jan. 3, 2011, 8 pages.
Gong et al.: "Dynamic Vision: From Images to Face Recognition," 2000, Imperial College Press, London, GB, XP002614932, pp. 267-280.
Gong S. et al.: "An Investigation into Face 1-11 Pose Distributions," Proceedings of the International Conference on Automatic Face and Gesture Recognition, XX, XX, Oct. 14, 1996, pp. 265-270, XP000989936.
McKenna S. J. et al: "Real-Time Face Pose Estimation," Real-Time Imaging, Academic Press Limited, GB, vol. 4, No. 5, Jan. 1, 1998, pp. 333-347, XP004552095, ISSN: 1077-2014, DOI: DOI:10.1016/S1077-2014(98) 90003-1.
Lee Ping-Hsien et al.: "On Efficient Multi-Angle Face Prototype Collection," Automatic Face and Gesture Recognition, 2004. Proceedings. Sixth IEEE International Conference on, IEEE Piscataway, NJ, USA, May 17, 2004, pp. 743-748, XP010949522, ISBN: 978-0-7695-2122-0.
Volker Krüger et al.: "Exemplar-Based Face 1-11 Recognition from Video," In Proc. ECCV2002—7th European Conference on Computer Vision, May 1, 2002,p. 732-746, XP002522075.
Arandjelovic, O.: "Face Recognition from 1-11 Face Motion Manifolds," First Year PhD Report, University of Cambridge, 2004, pp. 1-120, XP002614933.
Zhiguang Yang et al.: "Face Pose Estimation and Its Application in Video Shot Selection," Pattern Recognition, 2004, ICPR 2004. Proceedings of the 17th International Conference on Cambridge, UK Aug. 23-26, 2004, Piscataway, NJ, USA, IEEE, vol. 1, Aug. 23, 2004, pp. 322-325, XP010724250, DOI: DOI: 10.1109/ICPR.2004.1334117 ISBN: 978-0-7695-2128-2.
European Office Action dated Jun. 1, 2012 for Application No. 07 738 595.3 (5 pages).
Clippingdale et al: "Partial Automation of Database Acquisition in the FAVRET Face Tracking and Recognition System Using a Bootstrap Approach," IAPR Workshop on Machine Vision Application, Tokyo, Japan, Nov. 2000, pp. 28-30.

* cited by examiner

F I G. 5

| MAIN CONDITION | SUB-CONDITION A | SUB-CONDITION B | SUB-CONDITION C |
|---|---|---|---|
| DIRECTION OF FACE | UPWARD | 0° TO 30° | EVERY 5° |
| | DOWNWARD | 0° TO 30° | EVERY 5° |
| | RIGHTWARD | 0° TO 30° | EVERY 5° |
| | LEFTWARD | 0° TO 30° | EVERY 5° |
| BRIGHTNESS | FLASH | WITH/WITHOUT | |
| | CONTRAST TO BACKGROUND | LIGHT/DARK | |
| EXPRESSION OF FACE | EYES | OPEN/CLOSE | |
| | MOUTH | OPEN/CLOSE | |
| ADDITIONAL FEATURE | GLASSES | | |
| | BEARD | | |

FACE-IMAGE REGISTRATION DEVICE, FACE-IMAGE REGISTRATION METHOD, FACE-IMAGE REGISTRATION PROGRAM, AND STORAGE MEDIUM

TECHNICAL FIELD

The present invention relates to a face-image registration device, a face-image registration method, a face-image registration program, and a storage medium each of which is for registering, in a dictionary, a face image to be used in face recognition.

BACKGROUND ART

Reflecting the increase in people's sense of security, use of a face recognition system has been rapidly expanding in recent years. The face recognition system has advantages that a conventional recognition system which uses a code number does not have. For example, the face recognition system has a significantly lower possibility that information (i.e., a characteristic of a person's face) necessary for recognition is stolen by others; and convenience such that recognition can surely be carried out as long as a person to be recognized is in the place. Because of these advantages, it is expected that the face recognition system will become further widespread.

Nevertheless, the face recognition system still has various kinds of problems unsolved. One of the problems is that its recognition accuracy is not sufficiently high yet. The face recognition system does not reach such a level that allows recognition merely by showing a face image. For example, such a problem actually occurs that a change in brightness of a person's background prevents recognition of the person.

In view of this, various kinds of techniques have been proposed so far for the purpose of improving accuracy of face recognition.

For example, Patent Document 1 discloses an image searching method including the steps of (i) detecting, from an image, frames containing face images; (ii) extracting the face images from the frames; (iii) grouping, out of all the face images thus extracted, the face images showing the same person to the same group; and (iv) extracting a representative face image for each person.

This method focuses on a face in an image in its detection process, and identifies the face thus detected. This makes it possible to display faces of persons shown in an image in such a manner that a face of a person is distinguished from a face of another person.

Patent Document 2 discloses a personal recognition device including: means for inputting, per frame, image data which is used for recognizing a person; means for detecting a face area from the image data; means for working out a characteristic amount in the face area; means for judging whether or not the characteristic amount is valid by comparing the characteristic amount with a standard value; means for storing characteristic amounts which are respectively worked out for a plurality of frames and are judged to be valid; means for obtaining a characteristic amount for face recognition by calculating the characteristic amounts respectively worked out for the plurality of frames; and means for recognizing the person by comparing the characteristic amount for recognition with a prestored face characteristic amount.

This device prevents a decrease in recognition accuracy even when a head posture or the expression of a face changes. This improves accuracy in working-out of a characteristic amount used for judging a valid frame.

Patent Document 3 discloses a recognition system including: a face recognition database for storing a plurality of pieces of face information which are obtained by capturing, in a plurality of different circumstances, a face image of a person to be recognized and each of which pieces of face information has a pattern name corresponding to each of the circumstances; a person-to-be-recognized identification table for associating a certain pattern name stored in the face recognition database with the person to be recognized whose image is captured under the certain pattern name; a camera for obtaining the face information by capturing the face image of the person to be recognized; recognition processing means for comparing the face information captured by the camera with the plurality of pieces of face information stored in the face recognition database so as to determine face information having the highest similarity; person-to-be-recognized identification means for identifying, by looking up the pattern name in the person-to-be-recognized identification table, the person who is to be recognized and corresponds to the pattern name of the face information determined by the recognition processing means.

This system prepares a plurality of pieces of face information obtained in different circumstances. This makes it possible to recognize a face in any circumstances.

Patent Document 4 discloses a device for adding a new entry to a face-image database which device registers a new person in a personal-face-image database and a personal-face-feature database. The device disclosed in Patent Document 4 includes: estimation means for estimating (i) the positions of a plurality of characteristic points in a face area of a person shown in an inputted image and (ii) the direction of a face of the person; selection means for selecting, from the inputted image, a frame in which the face of the person points a predetermined direction, the selection being made in accordance with information on the direction of the face estimated by the estimation means or information on the direction of the face which is externally inputted; user interface means for causing to display, in response to a command given by a user, (i) the frame selected by the selection means and (ii) information relevant to the frame; working-out means for working out, in the vicinity of the plurality of characteristic points estimated by the estimation means, a characteristic amount of the face of the person in the frame selected by the selection means so as to obtain a database component of the person shown in the inputted image.

This device makes it possible to automatically register a new person in a database.

[Patent Document 1]
Japanese Unexamined Patent Application Publication, Tokukai, No. 2001-167110 (published on Jun. 22, 2001)
[Patent Document 2]
Japanese Unexamined Patent Application Publication, Tokukaihei, No. 6-259534 (published on Sep. 16, 1994)
[Patent Document 3]
Japanese Unexamined Patent Application Publication, Tokukai, No. 2005-115481 (published on Apr. 28, 2005)
[Patent Document 4]
Japanese Unexamined Patent Application Publication, Tokukai, No. 2002-133423 (published on May 10, 2002)

DISCLOSURE OF INVENTION

In order to improve recognition accuracy in a recognition device which uses a face image, it is necessary to register face images captured under various kinds of conditions. However, it is complicated and sometimes difficult to manually select an image suitable for registration from a large number of still images so as to register the image.

The technique disclosed in Patent Document 1 is no more than a technique for grouping face images of the same person to the same group. In addition, no effort is made in a process of registering, in a dictionary, the face images thus grouped.

The technique disclosed in Patent Document 2 is no more than a technique for improving accuracy in working-out of a characteristic amount used for judging a valid frame. In addition, no effort is made in a process of registering, in a dictionary, the characteristic amount thus worked out.

The technique disclosed in Patent Document 3 requires a user to prepare various types of face information obtained in different circumstances in advance. Therefore, this technique has such a problem that it requires a user to carry out troublesome procedures.

The technique disclosed in Patent Document 4 is no more than a technique for estimating the positions of characteristic points in each frame in an inputted material. In addition, this technique requires a user to make a final decision. Therefore, this technique has such a problem that it requires a user to carry out troublesome procedures.

As such, there is a high possibility that all face images required by a recognition device cannot be obtained even by utilizing the conventional techniques. However, if a user selects and registers all of the face images manually, the user has to carry out lots of troublesome procedures.

The present invention was made to solve the foregoing problems, and an object of the present invention is to provide: a face-image registration device, a face-image registration method, a face-image registration program, and a storage medium each of which is for registering various face images in a dictionary without requiring a user to carry out troublesome procedures.

[Arrangement of Main Parts of Face-Image Registration Device]

In order to solve the foregoing problems, a face-image registration device in accordance with the present invention is a face-image registration device that extracts, from a moving image which is inputted thereto, a face image showing a face of a person and registers the face image in a dictionary, the face-image registration device including: representative-face-image extracting means for extracting, from the moving image, at least one face image which satisfies a predetermined representative condition, so as to obtain a representative face image; registration-face-image extracting means for extracting, from the moving image, at least one face image which shows the person shown in the representative face image but is not the representative face image and which satisfies a predetermined registration condition, so as to obtain a registration face image; and face-image registration means for registering, in the dictionary, the registration face image in association with the representative face image.

[Functions and Effects]

With this arrangement, the representative-face image extracting means extracts, from the moving image, at least one face image which satisfies the predetermined representative condition, so as to obtain the representative face image. The "face image" herein means a still image showing a face of a person. The "representative condition" herein means a condition to be satisfied by a face image which is the most suitable for face recognition out of various face images contained in a moving image. For example, a frontal face satisfies a representative condition. Therefore, the representative-face-image extracting means extracts, as a representative face image, for example, a frontal face image (i.e., an image showing a face looking the front) from a moving image.

Generally, a moving image is an image showing a moving person or a moving object. Therefore, it is not difficult for the representative-face-image extracting means to extract, from a moving image, a representative face image such as a frontal face image.

After the representative face image is extracted, the registration-face-image extracting means extracts, from the moving image, at least one face image which shows the person shown in the representative face image but is not the representative face image and which satisfies a predetermined registration condition, so as to obtain a registration face image. The "registration condition" herein means a condition satisfied by a face image which is suitable for image recognition. Examples of the registration condition encompass a condition satisfied by a face image showing a face in various kinds of states such as: a face looking upward; a face having beard; and a face with its mouth opened.

That is, when the representative-face-image extracting means extracts, for example, a frontal face image as a representative face image, the face-image registration device extracts, from the same moving image as used by the representative-face-image extracting means, various registration face images of the person shown in the frontal face image thus extracted. The registration face images thus extracted respectively satisfy various registration conditions such as for a face looking upward, a face having beard, and a face with its mouth opened.

The face-image registration means registers, in the dictionary, the registration-face-image extracting means in association with the representative face image. That is, for example, various face images such as a face image having beard are registered in the dictionary in association with a frontal face image. The registration herein is not limited to registration of an image. Alternatively, for example, the registration may be carried out such that (i) a characteristic amount representing a characteristic of an image is worked out and (ii) the characteristic amount thus worked out is registered in a dictionary, instead of an image.

With this process, the face-image registration device can register, in a dictionary in which a face image is registered, various face images of a certain person. This makes it possible to more surely increase the number of face images to be registered in a dictionary. Also, in this process, a face image is extracted from a moving image. This makes it possible to further reduce troublesome procedures required in a process of registering a face image, compared with: a method in which a user manually searches a face image to be registered; or a method in which registration face images are prepared in advance by capturing photographs under various kinds of different conditions. That is, the face-image registration device of the present invention can register various face images in a dictionary, without requesting a user to carry out troublesome procedures.

[Face-Image Registration Method]

In order to solve the foregoing problems, a face-image registration method in accordance with the present invention is a face-image registration method for extracting, from a moving image which is inputted thereto, a face image showing a face of a person and registering the face image in a dictionary, the method including: a representative-face-image extracting step of extracting, from the moving image, at least one face image which satisfies a predetermined representative condition, so as to obtain a representative face image; a registration-face-image extracting step of extracting, from the moving image, at least one face image which shows the person shown in the representative face image but is not the representative face image and which satisfies a predetermined registration condition, so as to obtain a registration face image; and a face-image registration step of registering, in the dictionary, the registration face image in association with the representative face image.

With this arrangement, the method attains the effects equivalent to those of the foregoing face-image registration device.

[Registration of Characteristic Amount]

Also, in the face-image registration device in accordance with the present invention, it is preferable that the face-image registration means registers, in the dictionary, a characteristic amount obtained by digitalizing a characteristic of the registration face image.

[Functions and Effects]

With this arrangement, the face-image registration means registers, in the dictionary, the characteristic amount obtained by digitalizing the characteristic of the registration face image. The characteristic amount of the face image is obtained by, for example, (i) detecting the positions of face parts in a face and then (ii) working out the arrangement of the positions or the like.

Generally, a characteristic amount worked out in this manner has much less amount of data than an image has. This allows the face-image registration device to have a dictionary having a smaller data size, compared with a case where a face image is directly registered in a dictionary.

[Registration of all Registration Face Images which Satisfy Registration Condition]

Also, in the face-image registration device in accordance with the present invention, it is preferable that: if a plurality of registration conditions different from each other are predetermined, the face-image registration means extracts at least one registration face image for each of the plurality of registration conditions which registration face image satisfies the registration condition; and the face-image registration means registers, in the dictionary, all of the registration face images in association with the representative face image, the registration face images being respectively extracted for each of the registration conditions.

[Functions and Effects]

With this arrangement, if the plurality of registration conditions different from each other are predetermined, the representative-face-image extracting means extracts at least one registration face image for each of the plurality of registration conditions which registration face image satisfies the registration condition. For example, when 10 registration conditions are predetermined, at least 10 registration face images which respectively satisfy the 10 registration conditions are extracted from a moving image.

Then, the face-image registration means registers, in the dictionary, all of the registration face images in association with the representative face image, the registration face images being respectively extracted for each of the registration conditions. That is, the face images which respectively satisfy all of the plurality of registration conditions are registered in the dictionary.

With this process, it is possible for a face-image registration device to have a dictionary having a further increased number of face images.

[One-by-One Registration of all Registration Face Images which Satisfy Registration Condition]

Also, in the face-image registration device in accordance with the present invention, it is preferable that: if the plurality of registration conditions different from each other are predetermined, the face-image registration means extracts one registration face image for each of the plurality of registration conditions which registration face image satisfies the registration condition; and the face-image registration means registers, in the dictionary, all of the registration face images in association with the representative face image, the registration face images being respectively extracted for each of the registration conditions.

[Functions and Effects]

With this arrangement, if the plurality of registration conditions different from each other are predetermined, the representative-face-image extracting means extracts one registration face image for each of the plurality of registration conditions which registration face image satisfies the registration condition. For example, when 10 registration conditions are predetermined, 10 registration face images which respectively satisfy the 10 registration conditions are extracted from a moving image.

Then, the face-image registration means registers, in the dictionary, all of the registration face images in association with the representative face image, the registration face images being respectively extracted for each of the registration conditions. That is, the plurality of face images which respectively satisfy all of the plurality of the registration conditions are registered in the dictionary.

With this process, it is possible for a face-image registration device to have a dictionary having an increased number of face images. Also, the number of face images to be registered in a dictionary is limited to one for each registration condition. This makes it possible to reduce the data size of a dictionary, compared with a case where a plurality of face images are registered for each registration condition.

[Registration of Face Images of all Persons]

Also, in the face-image registration device in accordance with the present invention, it is preferable that the representative-face-image extracting means extracts a plurality of representative face images different from each other, and the registration-face-image extracting means extracts the registration face image for each of the plurality of representative face images.

[Functions and Effects]

A moving image does not always include an image of one person, but often includes images of a large number of persons. In light of this, in this arrangement, the representative-face-image extracting means extracts the plurality of representative face images different from each other, and the registration-face-image extracting means extracts the registration face image for each of the plurality of representative face images. The "plurality of representative face images different from each other" herein mean a plurality of face images respectively showing faces of different persons. At this time, the registration face image extracts the registration face image for each of the different persons.

When a moving image includes a plurality of persons, the face-image registration means registers, in the dictionary, the registration face images in association with the representative face images, for each of the plurality of persons. This allows the dictionary to store the face images of the plurality of different persons.

With this process, it is possible for a face-image registration device to have a dictionary having an increased number of face images.

[Extraction of Face Image from Scene]

Also, it is preferable that the face-image registration device in accordance with the present invention further includes scene extracting means for extracting a scene from the moving image, wherein: the representative-face-image extracting means extracts the representative face image from the scene; and the registration-face-image extracting means extracts the registration face image from the scene.

[Functions and Effects]

With this arrangement, the scene extracting means extracts the scene from the moving image. The "scene" herein means a part of a moving image which part includes a plurality of frames continuously showing a certain face. For example, the scene extracting means uses a face tracking technique so as to extract, from a moving image, such a part of the moving image that includes (i) a frame in which a certain face comes, (ii) a certain number of frames in which the certain face is continuously shown, and (iii) a frame of which the certain face gets out. Thereby, the scene extracting means obtains one scene.

When the scene is extracted by the scene extracting means, the representative-face-image extracting means extracts the representative face image from the scene. This allows a part of a moving image to be a subject to be processed in extraction of a face image. Also, the registration-face-image extracting means extracts the registration face image from the same scene as used in the extraction of the representative face image. This allows a part of a moving image to be a subject to be processed in extraction of a face image.

With this process, when a face-image registration device extracts a face image, the face-image registration device only needs to process a part of a moving image, not a total of the moving image. This makes it possible to further reduce time required to register a face image.

[Process of a Plurality of Scenes]

Also, in the face-image registration device in accordance with the present invention, it is preferable that: the scene extracting means extracts, from the moving image, a plurality of scenes different from each other; and if the registration-face-image extracting means does not extract the registration face image from one of the scenes, the registration-face-image extracting means extracts the registration face image from another one of the scenes.

[Functions and Effects]

With this arrangement, the scene extracting means extracts, from the moving image, the plurality of scenes different from each other. At this time, for example, the scene extracting means uses, as a partition, a scene which does not show a face of a person. Then, the scene extracting means extracts, from the moving image, a plurality of parts of the moving image thus divided by the partition, so as to obtain scenes different from each other.

One scene does not always include all face images which respectively satisfy all registration conditions. In light of this, if the registration-face-image extracting means does not extract the registration face image from one of the scenes, the registration-face-image extracting means extracts the registration face image from another one of the scenes. This makes it possible to more surely increase the number of face images to be registered in a dictionary.

[Replacement of Face Image with Another Face Image Having Higher Recognition Confidence]

Also, in the face-image registration device in accordance with the present invention, it is preferable that: if one registration face image which satisfies a certain registration condition is already registered in the dictionary, the registration-face-image extracting means extracts another registration face image which satisfies the certain registration condition; and if the another registration face image is higher in recognition confidence level than the one registration face image, the face-image registration means replace the one registration face image with the another registration face image.

[Functions and Effects]

With this arrangement, if one registration face image which satisfies a certain registration condition is already registered in the dictionary, the registration-face-image extracting means extracts another registration face image which satisfies the certain registration condition.

Also, if the another registration face image is higher in recognition confidence level than the one registration face image, the face-image registration means replace the one registration face image with the another registration face image. This makes it possible to further increase a recognition confidence level of a face image registered in a dictionary.

This allows a face-image registration device to have a dictionary storing a face image having further improved recognition accuracy.

[Face-Image Registration Program and Storage Medium]

The face-image registration device may be realized by a computer. In this case, the present invention encompasses: a face-image registration program for causing a computer to function as each of the means so as to realize the face-image registration device by the computer; and a computer-readable storage medium in which the face-image registration program is stored.

Additional objects, features, and strengths of the present invention will be made clear by the description below. Further, the advantages of the present invention will be evident from the following explanation in reference to the drawings.

BRIEF DESCRIPTION OF DRAWINGS

FIG. 3 (*b*) is a view illustrating one example of a scene extracted by a scene extracting section.

FIG. 3 (*c*) is a view illustrating one example of a plurality of frames which respectively contain various face images and which constitute one scene.

FIG. 5 is a view illustrating one example of a pickup condition list 50.

EXPLANATION FOR REFERENCE NUMERALS

Figure 1:
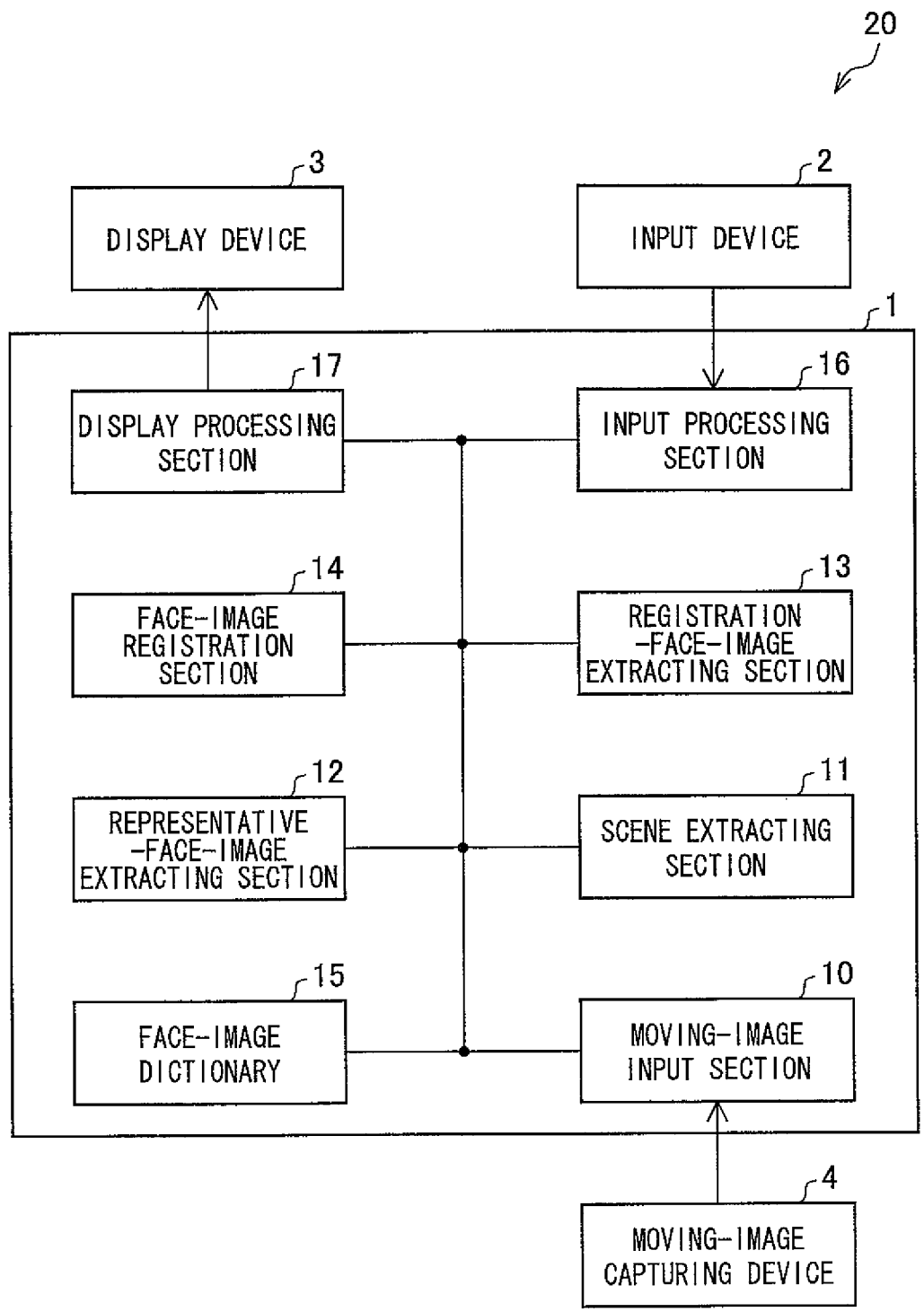
FIG. 1 is a block diagram illustrating an arrangement of the main parts in a face-image registration system according to one embodiment of the present invention.

1 Face-image registration device
2 Input device

3 Display device
10 Moving image input section
11 Scene extracting section (Video scene extracting means)
12 Representative-face-image extracting section (Representative-Face-Image Extracting Means)
13 Registration-face-image extracting section (Registration-Face-Image Extracting Means)
14 Face-image registration section (Face-image registration means)
15 Face-image dictionary (Dictionary)
16 Input processing section
17 Display processing section
20 Face-image registration system
40 Display
41 Frontal face image
42 Message box
50 Pickup condition list

BEST MODE FOR CARRYING OUT THE INVENTION

One embodiment of the present invention is described below with reference to FIGS. 1 to 11.

[Face-Image Registration System 20]

Firstly, the following describes an arrangement of a face-image registration system 20 with reference to FIG. 1. FIG. 1 is a block diagram illustrating an arrangement of the main parts of the face-image registration system 20 according to one embodiment of the present invention. As illustrated in FIG. 1, the face-image registration system 20 includes a face-image registration device 1, an input device 2, a display device 3, and a moving-image capturing device 4.

[Face-Image Registration Device 1]

The face-image registration device 1 is a device for registering, in a dictionary, a face image necessary for carrying out face recognition. The detail such as the arrangement and the outline of the face-image registration device 1 will be described later.

[Input Device 2]

The input device 2 is a device used by a user so that the user inputs information to the face-image registration device 1 or selects information displayed on the display device 3. The input device 2 is realized by, for example, a mouse or a keyboard.

[Display Device 3]

The display device 3 is a device for displaying information so as to show the information to a user. The display device 3 is realized by, for example, a liquid crystal display device or a plasma display device.

[Moving-Image Capturing Device 4]

The moving-image capturing device 4 is a device for capturing a moving image of a person or an object on the outside of the moving-image capturing device 4. The moving-image capturing device 4 is realized by, for example, a video camera.

[Face-Image Registration Device 1]

The face-image registration device 1 of the present embodiment is described below with reference to FIG. 1. As illustrated in FIG. 1, the face-image registration device 1 includes a moving-image input section 10, a scene extracting section 11 (scene extracting means), a representative-face-image extracting section 12 (representative-face-image extracting means), a registration-face-image extracting section 13 (registration-face-image extracting means), a face-image registration section 14 (face-image registration means), a face-image dictionary 15 (a dictionary), an input processing section 16, and a display processing section 17.

[Outline of Face-Image Registration Device 1]

Firstly, the following describes the outline of the face-image registration device 1. The face-image registration device 1 extracts, from a moving image, a face image suitable to be registered in a dictionary, and registers, in the dictionary, the face image thus extracted. An object of the face-image registration device 1 is not to divide scenes or to group face images, but is to improve accuracy of a dictionary and to simplify the procedure for improving the accuracy.

Specifically, the face-image registration device 1 extracts, from a moving image which is inputted thereto, a face image suitable for face recognition, and automatically registers, in the face-image dictionary 15, the face image thus extracted. In this process, a face image of a person selected by a user is selectively registered. The point is that a face image is extracted from a moving image.

There is a high possibility that a moving image contains a large number of face images which respectively satisfy various conditions. Therefore, the face-image registration device can extract various face images of a certain person from a moving image. This makes it possible to register various face images in the face-image dictionary 15. As a result, it is possible to reduce cases where the variation of face images registered in the face-image dictionary 15 becomes unbalanced, and to easily create the face-image dictionary 15 having high accuracy.

Thus, with use of a face-image dictionary 15 created by a face-image registration device 1, a recognition device can significantly improve accuracy of face recognition of a person.

[Registration Process of Face Image]

Figure 2:
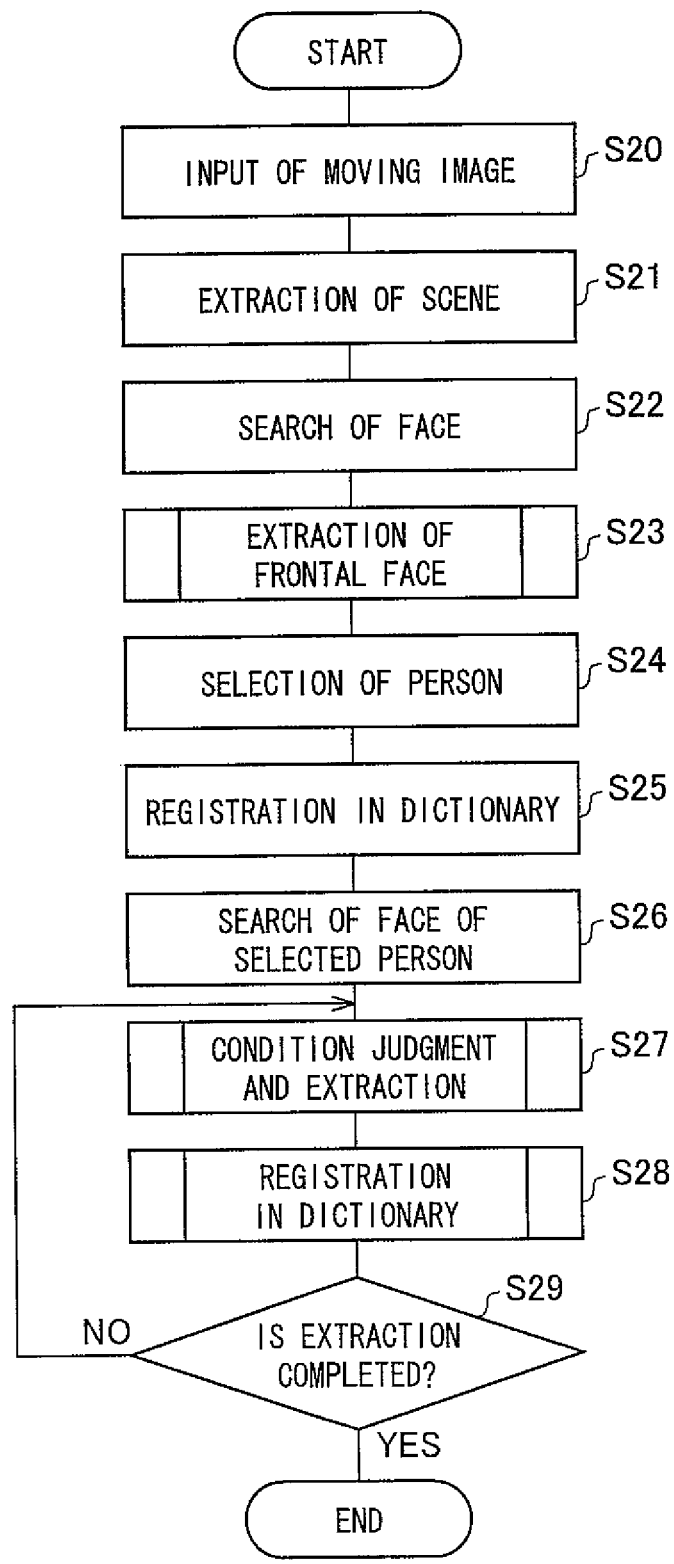
FIG. 2 is a flow chart of a process in which a face-image registration device extracts a face image from a moving image and registers, in a face-image dictionary, the face image thus extracted.

The following describes, with reference to FIG. 2, a process in which the face-image registration device 1 registers, in the face-image dictionary 15, the face image extracted from the moving image. FIG. 2 is a flow chart of a process in which the face-image registration device 1 extracts a face image from a moving image and registers, in the face-image dictionary 15, the face image thus extracted.

[Input of Moving Image]

Prior to the process illustrated in FIG. 2, a user takes a moving image by using the moving-image capturing device 4. Then, the moving-image capturing device 4 inputs, to the face-image registration device 1, the moving image thus captured (Step S20). In the face-image registration device 1, the moving-image input section 10 receives the moving image thus inputted. The input processing section 16 outputs, to the scene extracting section 11, the moving image thus received.

In the present invention, a moving image to be inputted to the face-image registration device 1 is not limited to the one captured by the moving-image capturing device 4, but may be, for example, a moving image in video software which is commercially available or a moving image which is available for free such as the one in a broadcasted drama program and a broadcasted sports program. That is, a moving image to be inputted to the face-image registration device 1 only needs to contain a face of a person.

[Example of Moving Image]

Figure 3:
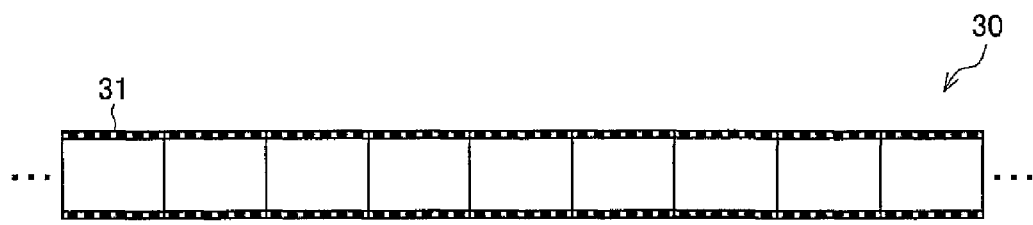
FIG. 3 (*a*) is a view illustrating one example of a moving image processed by a dictionary creation device in a process in which the dictionary creation device extracts a face image.
Figure 3:
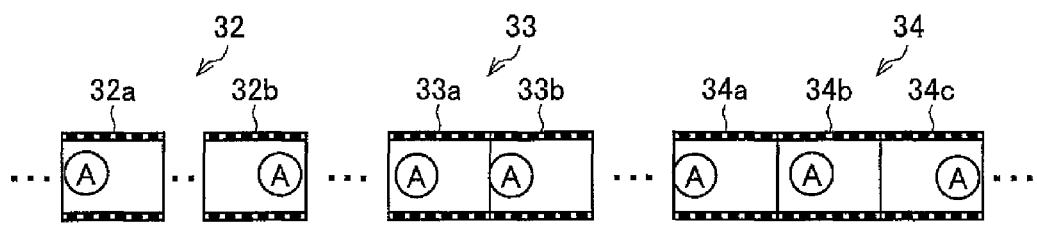
Figure 3:
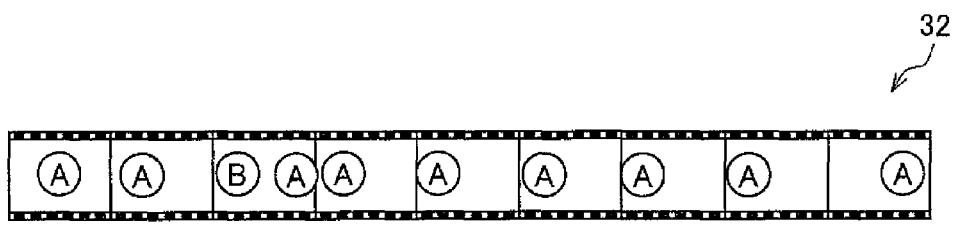

The face-image registration device 1 extracts a face image from a moving image. The following describes, with reference to FIG. 3 (a), one example of a moving image to be processed by the face-image registration device 1. FIG. 3 (a) is a view illustrating one example of a moving image processed by a dictionary creation device 1 in a process in which the dictionary creation device 1 extracts a face image.

As illustrated in FIG. 3 (a), a moving image 30 is constituted by a plurality of frames 31 which are continuously strung. The "frame" herein corresponds to a "koma (Japanese)" in an image. Each of the frames 31 is a single still image.

[Extraction of Scene]

In the face-image registration device, the scene extracting section 11 extracts at least one scene from the moving image which is inputted thereto (Step S21). The "scene" herein means a part of a moving image. The part includes some of the frames which constitute the moving image and are continuously strung. The scene extracting section 11 may extract, as one scene, a part of the moving image between (i) a frame in which the face of a certain person comes and (ii) a frame of which the face gets out. That is, one scene may be the one which starts at a frame in which a face of a certain person appears, and ends at a frame in which the face disappears.

The scene extracting section 11 may extract a scene from a moving image by using any known method. For example, the scene extracting section 11 may use a so-called face tracking technique for detecting and tracking a face which changes gradually and continuously. Alternatively, the scene extracting section 11 may (i) detect a change in a background of a moving image and (ii) divide the moving image into an earlier frame group and a later frame group at a frame in which its background image satisfies a predetermined condition. At this time, the earlier frame group and the later frame group thus created are extracted as different scenes from each other.

[One Example of Scene]

The following describes, with reference to FIG. 3 (b), one example of a scene extracted from a moving image by the scene extracting section 11. FIG. 3 (b) is a view illustrating one example of a scene extracted by the scene extracting section 11.

In the example illustrated in FIG. 3 (b), the scene extracting section 11 extracts three scenes (a scene 32, a scene 33, and a scene 34) from one moving image. The scene 32 has an arrangement where a plurality of frames (frames 32a through 32b) are continuously strung. These frames contain face images which are of a certain person and are captured in succession.

The scene 33 is constituted by two frames (a frame 33a and a frame 33b). No face image is included in a frame immediately before the frame 33a and a frame immediately after the frame 33b. Therefore, the scene extracting section 11 extracts, from a moving image, a part constituted by the two frames (the frames 33a and 33b), so as to obtain one scene 33.

The scene 34 has an arrangement where three frames (frames 34a through 34c) are continuously strung. These frames contain face images which are of a certain person and are captured in succession. Therefore, the scene extracting section 11 extracts, from a moving image, a part constituted by three frames (the frames 34a through 34c), so as to obtain one scene 34.

[One Example of Frame]

The following describes, with reference to FIG. 3 (c), a frame constituting a scene. FIG. 3 (c) is a view illustrating one example of a plurality of frames which respectively contain various face images and which constitute one scene 32.

As illustrated in FIG. 3 (c), the scene 32 is constituted by a plurality of frames. The frames contain a face image of at least one person. The scene 32 also includes a frame containing a face image which is of another person and is captured together with the face image of the one person. Note that all of the frames do not necessarily contain face images of a plurality of persons. However, the frames respectively contain face images showing faces having different characteristics. Examples of the faces having different characteristics encompass: a frontal face, a face in profile, a face having beard, and a face opening its mouth.

[Extraction of Frontal Face]

The scene extracting section 11 outputs, to the representative-face-image extracting section 12, the scene which is extracted in Step S21. In the scene thus inputted, the representative-face-image extracting section 12 searches various face images (Step S22).

At this time, the representative-face-image extracting section 12 extracts a face image which satisfies a predetermined representative condition. The "representative condition" herein means a condition to be satisfied by a face image which is the most suitable for face recognition of various face images contained in a moving image. In the face-image registration device 1, the representative condition is stored in a memory (not illustrated) in advance. In the present embodiment, the representative condition is a condition satisfied by a frontal face image. Therefore, the representative-face-image extracting section 12 extracts a frontal face image from the scene which is inputted thereto (Step S23).

Note that the representative condition is not limited to the condition satisfied by a frontal face image. The representative condition only needs to be the one satisfied by a face image suitable for face recognition.

The representative-face-image extracting section 12 may extract, from the scene, as much number of face images which satisfy the representative condition as possible. That is, the representative-face-image extracting section 12 may extract one face image of a certain person and another face image of the certain person as different representative face images.

In the face-image registration device 1, a user may set a representative condition as needed. In this case, the representative-face-image extracting section 12 extracts, from a scene, a face image which satisfies the representative condition thus set by the user, so as to obtain a representative face image.

[Selection of Person]

In the present embodiment, the representative-face-image extracting section 12 extracts, from the scene which is inputted thereto, as much number of representative face images as possible, regardless of whether or not the face images are of the same person. Then, the representative-face-image extracting section 12 outputs, to the display processing section 17, all the representative face images thus extracted.

After the representative-face-image extracting section 12 finishes extracting the representative face images from the scene, the face-image registration device 1 selects one representative face image out of the representative face images thus extracted (Step S24). The face-image registration device 1 of the present embodiment requests a user to select one representative face image of a person whom the user wants to register in the face-image dictionary 15.

Specifically, the display processing section 17 causes the display device 3 to display all of the representative face images which are inputted thereto. The user looks at the representative face images displayed on the display device 3. Next, the user selects, by means of the input device 2, one representative face image out of the representative face images thus displayed. The selection result is received by the input processing section 16. The input processing section 16 outputs, to the registration-face-image extracting section 13, information on the representative face image thus selected by the user. Then, the registration-face-image extracting section 13 determines the representative face image thus selected by the user as a subject to be processed.

Figure 4:
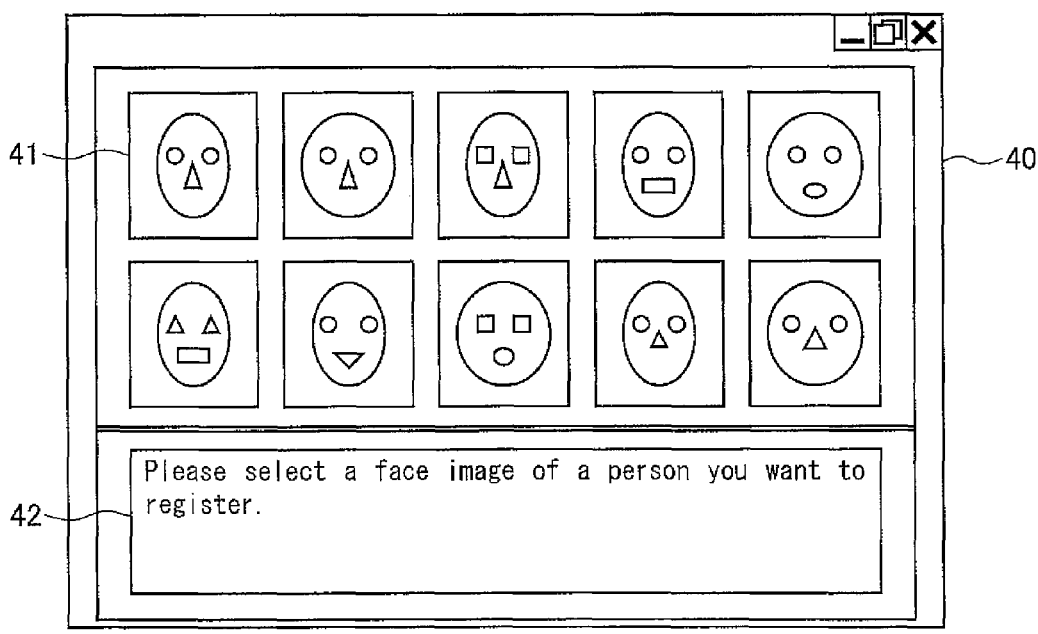
FIG. 4 is a view illustrating one example of a display for requesting a user to select a representative face image.

FIG. 4 is a view illustrating one example of a display for requesting a user to select a representative face image. The display processing section 17 causes the display device 3 to indicate a display 40 illustrated in FIG. 4. The display 40 contains: an area for displaying a plurality of frontal face images (including a frontal face image 41); and a message box 42. The message box 42 displays a message for prompting a user to select a face image. In the example illustrated in FIG. 4, the following message is displayed: "Please select a face image of a person you want to register."

As described above, the representative-face-image extracting section 12 can extract a frontal face image of a certain person more than once so as to obtain a plurality of different representative face images. In this case, the display processing section 17 causes the display device 3 to simultaneously display the plurality of different frontal face images of the certain person.

[Registration of Selected Person]

The registration-face-image extracting section 13 registers, in the face-image dictionary 15, the frontal face image selected by the user (Step S25). At this time, a specific identifier for identifying the frontal face image thus selected may be registered in the face-image dictionary 15, or the frontal face image thus selected may directly be registered in the face-image dictionary 15. Alternatively, a characteristic amount of the face image may be registered in the face-image dictionary 15. The characteristic amount can be worked out by using a method described later. By any means, it is the same in a point that the face-image dictionary 15 is provided with a new storage area for registering the face image of the person selected.

[Search of Face Image of Person to be Registered]

The registration-face-image extracting section 13 searches, in the scene which is inputted thereto, various face images of the person whose frontal face image is selected by the user (Step S26). At this time, the registration-face-image extracting section 13 searches, regardless of the condition, all face images judged to show the person shown in the frontal face image which is extracted. In this process, any known judgment method may be used. In the present embodiment, the registration-face-image extracting section 13 searches, in a batch, images judged to be a face image.

[Condition Judgment and Extraction]

After the various face images are searched in Step S26, the registration-face-image extracting section 13 judges whether or not the face images thus searched satisfy a predetermined pickup condition (registration condition). Then, the registration-face-image extracting section 13 extracts a face image judged to satisfy the predetermined pickup condition as the face image to be registered in the face-image dictionary 15 (Step S27). At this time, the registration-face-image extracting section 13 uses a pickup condition list which is stored in a memory (not illustrated) in advance. The "pickup condition list" herein means a list including various kinds of pickup conditions to be satisfied by a face image suitable to be registered in a face-image dictionary 15.

[Pickup Condition List 50]

The following describes, with reference to FIG. 5, a pickup condition list 50 used by the registration-face-image extracting section 13. FIG. 5 is a view illustrating one example of the pickup condition list 50.

As illustrated in FIG. 5, the pickup condition list 50 defines a main condition, a sub-condition A, a sub-condition B, and a sub-condition C. As the main condition, the characteristics of a face image are classified roughly. Examples of the main condition of the pickup condition defined in the pickup condition list 50 encompass: the direction of a face; brightness; the expression of a face; and an additional feature.

The sub-condition A has a definition obtained by further classifying the main condition. For example, the followings are defined as the sub-condition A: "upward", "downward", "rightward", and "leftward" for "the direction of a face"; "a flash" and "a contrast to a background" for "brightness"; "eyes" and "a mouth" for "the expression of a face"; and "glasses" and "beard" for "an additional feature".

The sub-condition B has a definition obtained by further classifying the sub-condition A. For example, the followings are defined as the sub-condition B: "0° to 30°" for "upward"; "with" and "without" for "a flash"; "light" and "dark" for "a contrast to a background"; and "open" and "close" for "eyes".

The sub-condition C has a definition obtained by further classifying the sub-condition B. For example, the following is defined as the sub-condition C: "every 5°" for "0° to 30°".

As such, the sub-condition level (i.e., the number of sub-conditions to be set) is different between the pickup conditions. Even if the sub-condition level is different between the pickup conditions, each of the pickup conditions is a condition for extracting a face image. That is, the difference in the sub-condition level only means the difference in the number of conditions used for determining that a face image satisfies a certain condition.

The registration-face-image extracting section 13 creates various kinds of pickup conditions by combining, as needed, a main condition defined in the pickup condition list 50 with a sub-condition subordinate to the main condition. For example, "a face pointing upward 5 degrees" is one of the pickup conditions for "the direction of a face".

The detail of the process of Step S27 will be described later. Through this process, the registration-face-image extracting section 13 extracts, from the scene, at least one face image which satisfies at least one pickup condition defined in the pickup condition list 50, so as to obtain a registration face image (i.e., a face image to be registered in the face-image dictionary 15).

[Registration of Face Image]

The registration-face-image extracting section 13 outputs, to the face-image registration section 14, the registration face image thus extracted from the scene. The face-image registration section 14 registers, in the face-image dictionary 15, the registration face image thus inputted (Step S28). The detail of this process will be described later.

[Final Judgment Process]

After the registration face image is registered in the face-image dictionary 15 in Step S28, the registration-face-image extracting section 13 judges whether or not the extraction of the face image from the scene has completed (Step S29). The registration-face-image extracting section 13 judges that the extraction of the face image has completed when any one of the following conditions is satisfied:

Condition A: Face images which respectively satisfy all pickup conditions defined in a pickup condition list 50 have been registered in a face-image dictionary 15, Condition C: All scenes in one moving image have been processed, Condition B: A certain number of scenes have been processed, Condition D: All of a plurality of moving images which are inputted have been processed, Condition E: A certain number of moving images have been processed, and Condition F: A certain period of time has passed since an extraction process starts.

When it is judged that any of Conditions A to F is not satisfied (NO), the procedure in FIG. 2 returns to Step S27. At this time, the registration-face-image extracting section 13 selects a new face image out of the face images which are searched from the scene but are not judged whether or not the face images satisfy the pickup condition. Then, the registration-face-image extracting section 13 judges whether or not the face image thus selected satisfies the pickup condition.

Thus, the registration-face-image extracting section 13 repeatedly judges whether or not each of the face images searched from the scene satisfies the pickup condition used for obtaining a registration face image. This process is repeated until the registration-face-image extracting section 13 obtains the result of "true" in a final judgment process illustrated as Step S29.

[Detail of Condition Judgment and Extraction]

Figure 6:
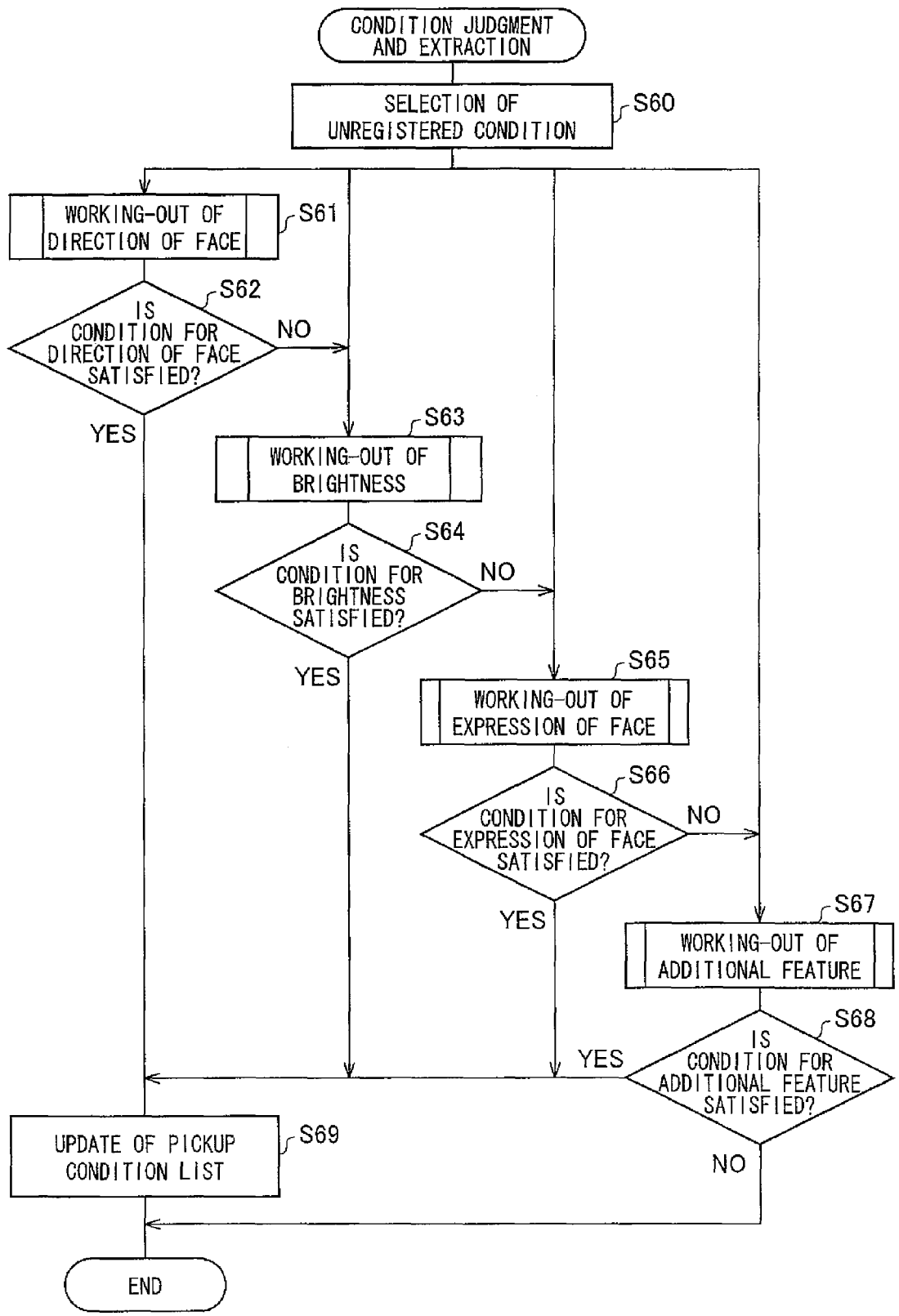
FIG. 6 is a flow chart of a process in which a registration-face-image extracting section extracts, from a scene, a face image which satisfies a pickup condition.

The following describes, with reference to FIG. 6, the detail of the condition judgment and the extraction (illustrated as Step S27). FIG. 6 is a flow chart of a process in which the registration-face-image extracting section 13 extracts, from the scene, a face image which satisfies a pickup condition.

The registration-face-image extracting section 13 of the present embodiment extracts, from a scene, a face image which satisfies a pickup condition by using techniques such as a technique disclosed in Japanese Unexamined Patent Application Publication, *Tokukai*, No. 2005-49854. That is, the registration-face-image extracting section 13 of the present embodiment does not need, in advance, face images (i.e., templates) which respectively satisfy pickup conditions. If a condition which is defined as a pickup condition is given, a face image which satisfies the condition is automatically extracted for each person.

[Selection of Unregistered Condition]

The registration-face-image extracting section 13 first selects one unregistered pickup condition (Step S60). The "unregistered pickup condition" herein means a condition satisfied by a face image which is of a person shown in a representative face image selected and which is not registered in the face-image dictionary 15 yet. For example, when a face image which satisfies a pickup condition for "the direction of a face" is not registered in the face-image dictionary 15 yet, the registration-face-image extracting section 13 selects, from the pickup condition list 50, the pickup condition for "the direction of a face".

The registration-face-image extracting section 13 carries out a process required by the condition thus selected. In the example illustrated in FIG. 6, the procedure jumps to a block in which the condition thus selected is processed.

In the present embodiment, a flag is set for each pickup condition in the pickup condition list 50. The flag indicates that a face image satisfying the pickup condition is already registered in the face-image dictionary 15. Therefore, the registration-face-image extracting section 13 may select an unregistered pickup condition by selecting, out of the pickup conditions defined in the pickup condition list 50, a condition for which a flag is not set.

[Working-Out and Judgment of Direction of Face]

In the following description, it is assumed that a registration face image which satisfies the condition for "the direction of a face" is not registered in the face-image dictionary 15. In this case, the registration-face-image extracting section 13 works out the direction of a face in a face image to be processed. For example, the registration-face-image extracting section 13 works out the direction and the value as follows: "upward at 40 degrees".

At this time, the registration-face-image extracting section 13 works out the direction of the face based on information such as:

The shape of a triangle created by connecting the eyes and the mount; and

The distance between the outer corner of the eye and the contour of the face, and the relative vertical direction (i.e., rightward/leftward) between the two.

The method for working out the information has been already established. Therefore, the detailed description of the method is omitted here.

The registration-face-image extracting section 13 judges whether or not the direction of the face thus worked out satisfies the pickup condition which is selected (Step S62). If the registration-face-image extracting section 13 judges the direction of the face satisfies the pickup condition (YES), the registration-face-image extracting section 13 updates the pickup condition (Step S69). The detail of the update process will be described later.

[Working-Out and Judgment of Brightness]

When it is judged that the direction of the face worked out in accordance with the face image does not satisfy the pickup condition for "the direction of a face" (NO) in Step S62, the registration-face-image extracting section 13 works out the brightness of the face image (Step S63).

In this case, the registration-face-image extracting section 13 determines the brightness of the face image in accordance with information such as:

Information on an aperture used for creating the image file,

Information on a flash,

A difference in brightness between the background and the face, and

An average value of the brightness levels of pixels inside the contour of the face image.

The method for working out the information has been already established. Therefore, the detailed description of the method is omitted here.

The registration-face-image extracting section 13 judges whether or not the brightness thus worked out satisfies the pickup condition which is selected (Step S64). If the registration-face-image extracting section 13 judges the brightness satisfies the pickup condition (YES), the registration-face-image extracting section 13 updates the pickup condition (Step S69). The detail of the update process will be described later.

[Working-Out and Judgment of Expression of Face]

When it is judged that the brightness thus worked out in accordance with the face image does not satisfy the pickup condition for "brightness" (NO) in Step S64, the registration-face-image extracting section 13 works out the expression of the face shown in the face image (Step S65).

In this case, the registration-face-image extracting section 13 works out the expression of the face shown in the face image in accordance with information such as:

An edge amount in an area around the center of the eye,

An edge amount in four directions (upward, downward, rightward, and leftward) from the center of the eye, The border between the iris and the white in the eye, and The ratio between the height and the width of the eye.

The method for working out the information has been already established. Therefore, the detailed description of the method is omitted here.

The registration-face-image extracting section 13 judges whether or not the expression of the face thus worked out satisfies the pickup condition for "the expression of a face" (Step S68). If the registration-face-image extracting section 13 judges that the expression of the face satisfies the pickup condition (YES), the registration-face-image extracting section 13 updates the pickup condition (Step S69). The detail of the update process will be described later.

[Working-out and Judgment of Additional Feature]

When it is judged that the expression of the face thus worked out in accordance with the face image does not satisfy the pickup condition for "the expression of a face" (NO) in Step S66, the registration-face-image extracting section 13 works out an additional feature (Step S67).

In this case, the registration-face-image extracting section 13 works out whether or not the face image contains an additional feature, in accordance information such as:

A difference between the face image which is in process and the representative face image, A difference between the color of the skin and the color of the surrounding of the eye, and The color (black) of the surrounding of the mouth.

The method for working out the information has been already established. Therefore, the detailed description of the method is omitted here.

The registration-face-image extracting section 13 judges whether or not the additional feature thus worked out satisfies the pickup condition for "an additional feature" (Step S68). If the registration-face-image extracting section 13 judges that the additional feature satisfies the pickup condition (YES), the registration-face-image extracting section 13 updates the pickup condition (Step S69). The detail of this process will be described later.

[Update of Pickup Condition List 50]

When it is judged that any condition (i.e., any of the direction of a face, brightness, the expression of a face, and an additional feature) worked out in accordance with the face image satisfies the pickup condition which is selected (YES), the registration-face-image extracting section 13 updates the pickup condition list 50 (Step S69). Specifically, a flag is set in the pickup condition list 50. The flag indicates that a face image satisfying the pickup condition which is selected is already registered in the face-image dictionary 15. Therefore, when the registration-face-image extracting section 13 processes a next face image, the registration-face-image extracting section 13 does not select again the condition which is registered this time.

[Summary]

As described above, a user selects a person to be registered in a face-image dictionary 15. Then, in accordance with the selection, the face-image registration device 1 automatically creates a face-image dictionary 15 which is the most suitable for face recognition of the person thus selected. That is, various face images which are different from each other are automatically extracted from a moving image (a scene), and the face images thus extracted are registered in the face-image dictionary 15. This reduces troublesome procedures required to register a face image, compared with a conventional art.

The face image registration device 1 may request a user to select a registration face image to be registered in a face-image dictionary 15. In this case, the face-image registration device 1 causes a display device 3 to display, in a list, various face images which are searched. Then, the user selects a face image out of the face images thus displayed, and the face image thus selected is registered in the face-image dictionary 15. That is, the user's judgment is taken into account when a face image to be registered is selected. This further increases the accuracy of the face-image dictionary 15.

[Random Selection]

In the embodiment described above, the registration-face-image extracting section 13 updates the pickup condition list 50 every time the registration-face-image extracting section 13 extracts a face image which satisfies the pickup condition. Alternatively, the registration-face-image extracting section 13 may first store, in a memory, all face images which respectively satisfy the pickup conditions. In this case, after the extraction of the face images has completed, the registration-face-image extracting section 13 may randomly select one face image to be registered in the face-image dictionary 15. Alternatively, a face image to be registered may be selected by a user.

[Detail of Registration in Face-Image Dictionary 15]

Figure 7:
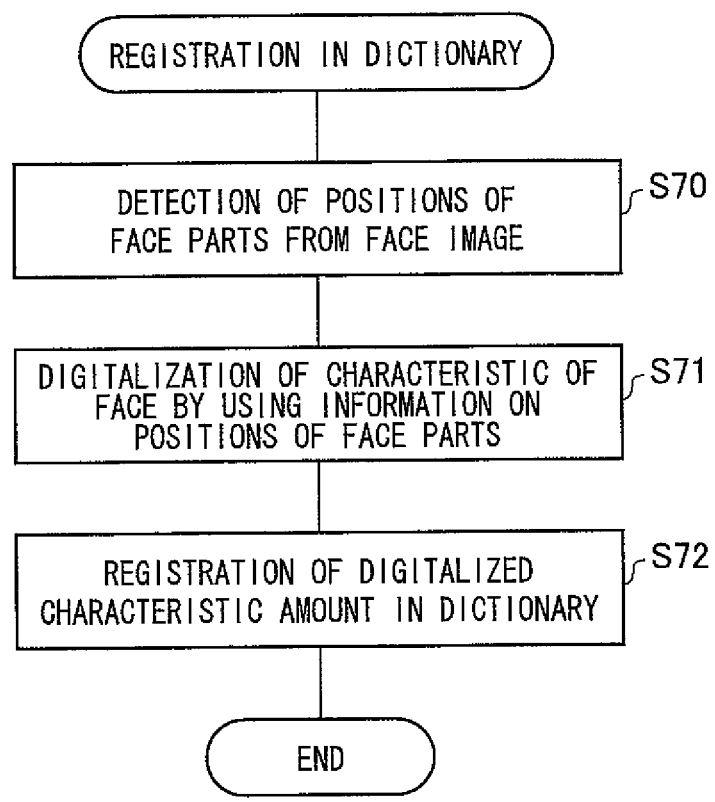
FIG. 7 is a flow chart illustrating a process in which the face-image registration section registers, in the face-image dictionary, a registration face image extracted by the registration-face-image extracting section.

The following describes, with reference to FIG. 7, a process for registering a face image in the face-image dictionary 15. This process is carried out by the face-image registration section 14 in Step S28. FIG. 7 is a flow chart illustrating a process in which the face-image registration section 14 registers, in the face-image dictionary 15, a registration face image extracted by the registration-face-image extracting section 13.

[Detection of Positions of Face Parts]

As illustrated in FIG. 7, the face-image registration section 14 first detects the positions of various face parts in a face shown in a face image (Step S70). Specifically, the face-image registration section 14 detects: the center of an eye; the outer corner of an eye; the inner corner of an eye; a mouth; the corners of a mouth; and the ends of an eyebrow. The detailed description of the detection method of the face parts is omitted here because this method is well known. The face parts to be detected by the face-image registration section 14 are not limited to the items described above, but may be any face parts. Also, the number of face parts to be detected is not particularly limited. The face-image registration device 1 predetermines, in a memory (not illustrated), what kind of and how many face parts are to be detected.

[Working-Out of Characteristic Amount]

After the face-image registration section 14 detects the positions of the face parts in the face image, the face-image registration section 14 works out a characteristic amount of the face image in accordance with the information on the positions of the face parts thus detected (Step S71). In this process, the characteristic of the face image is digitalized. The digitalization method has been already established. Therefore, the detailed description of this method is omitted here.

[Registration of Characteristic Amount]

Next, the face-image registration section 14 registers, in the face-image dictionary 15, the characteristic amount in association with the representative face image which is already registered, the characteristic amount thus being worked out (Step S72).

With this process, the face-image registration section 14 registers less amount of data in the face-image dictionary 15, compared with a case where the face image is directly registered in the face-image dictionary 15. This makes it possible to reduce the data size of the face-image dictionary 15 to be created.

[Condition Judgment and Extraction]

In the embodiment described so far, the face-image registration device 1 extracts a face image satisfying a pickup condition which is not registered in the face-image dictionary 15 yet. Then, the face-image registration device 1 registers, in the face-image dictionary 15, the face image thus extracted. However, the face-image registration device 1 may extract any face image as far as the face image satisfies a pickup condition, regardless of whether or not the pickup condition is already registered. In such a case, the registration-face-image extracting section 13 judges which is more suitable for face recognition: the face image which is already registered in the face-image dictionary 15, or the registration face image which is newly extracted. When the registration-face-image extracting section 13 judges that the face image which is newly extracted is more suitable for face recognition, the face image which is already registered is replaced with the face image which is newly extracted.

Figure 8:
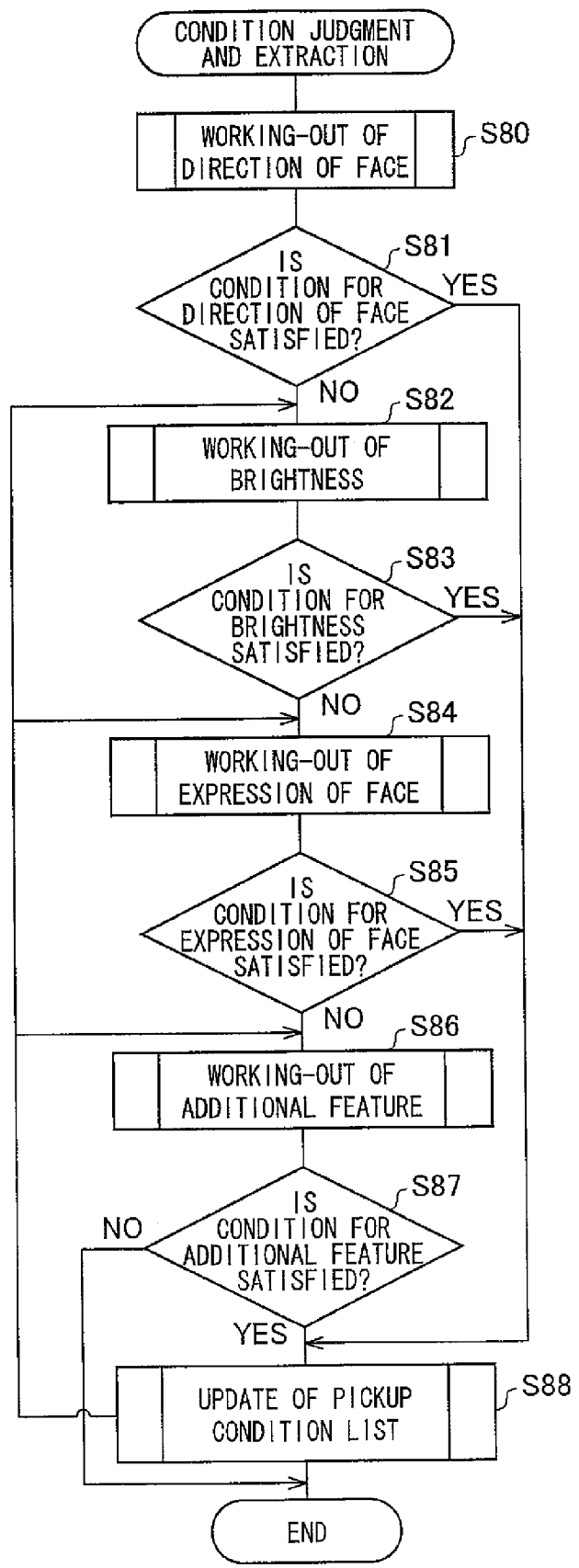
FIG. 8 is a flow chart illustrating a process in which the registration-face-image extracting section extracts a face image which satisfies a pickup condition.

The following describes this process with reference to FIG. 8. FIG. 8 is a flow chart illustrating a process in which the registration-face-image extracting section 13 extracts a face image which satisfies a pickup condition.

Prior to this process, the registration-face-image extracting section 13 selects one face image to be processed. Next, the face-image registration section 14 works out the direction of the face shown in the face image thus selected (Step S80). The description of the process of working out the direction of a face is omitted here because this process is already described above. The registration-face-image extracting section 13 judges whether or not the direction of the face image thus worked out satisfies at least one pickup condition for "the direction of a face", the pickup condition being defined in the pickup condition list 50 (Step S81).

When it is judged that the direction of the face thus worked out satisfies the pickup condition (YES) in Step S81, the registration-face-image extracting section 13 updates the pickup condition list 50. This process will be described in detail later.

When it is judged that the direction of the face thus worked out does not satisfy the pickup condition (NO) in Step S81, the registration-face-image extracting section 13 next works out the brightness of the face image which is selected (Step S82). The description of the process of working out brightness is omitted here because this process is already described above. The registration-face-image extracting section 13 judges whether or not the brightness thus worked out satisfies at least one pickup condition for "brightness", the pickup condition being defined in the pickup condition list 50 (Step S83).

When it is judged that the brightness thus worked out satisfies the pickup condition (YES) in Step S83, the registration-face-image extracting section 13 updates the pickup condition list 50. This process will be described in detail later.

When it is judged that the direction of the face thus worked out does not satisfy the pickup condition (NO) in Step S83, the registration-face-image extracting section 13 next works out the expression of the face shown in the face image which is selected (Step S82). The description of the process of working out the expression of a face is omitted here because this process is already described above. The registration-face-image extracting section 13 judges whether or not the expression of the face thus worked out satisfies at least one pickup condition for "the expression of a face", the pickup condition being defined in the pickup condition list 50 (Step S85).

When it is judged that the brightness thus worked out satisfies the pickup condition (YES) in Step S83, the registration-face-image extracting section 13 updates the pickup condition list 50. This process will be described in detail later.

When it is judged that the expression of the face thus worked out does not satisfy the pickup condition (NO) in Step S85, the registration-face-image extracting section 13 next works out an additional feature on the face image which is selected (Step S86). The description of the process of working out the expression of a face is omitted here because this process is already described above. The registration-face-image extracting section 13 judges whether or not the additional feature thus worked out satisfies at least one pickup condition for "an additional feature", the pickup condition being defined in the pickup condition list 50 (Step S87).

[Update of Pickup Condition List]

When the face image satisfies the pickup condition, the registration-face-image extracting section 13 updates the pickup condition list 50 (Step S88). At this time, the pickup condition to be satisfied by the face image may be any pickup condition in the pickup condition list 50.

[Detail of Update of Pickup Condition List]

Figure 9:
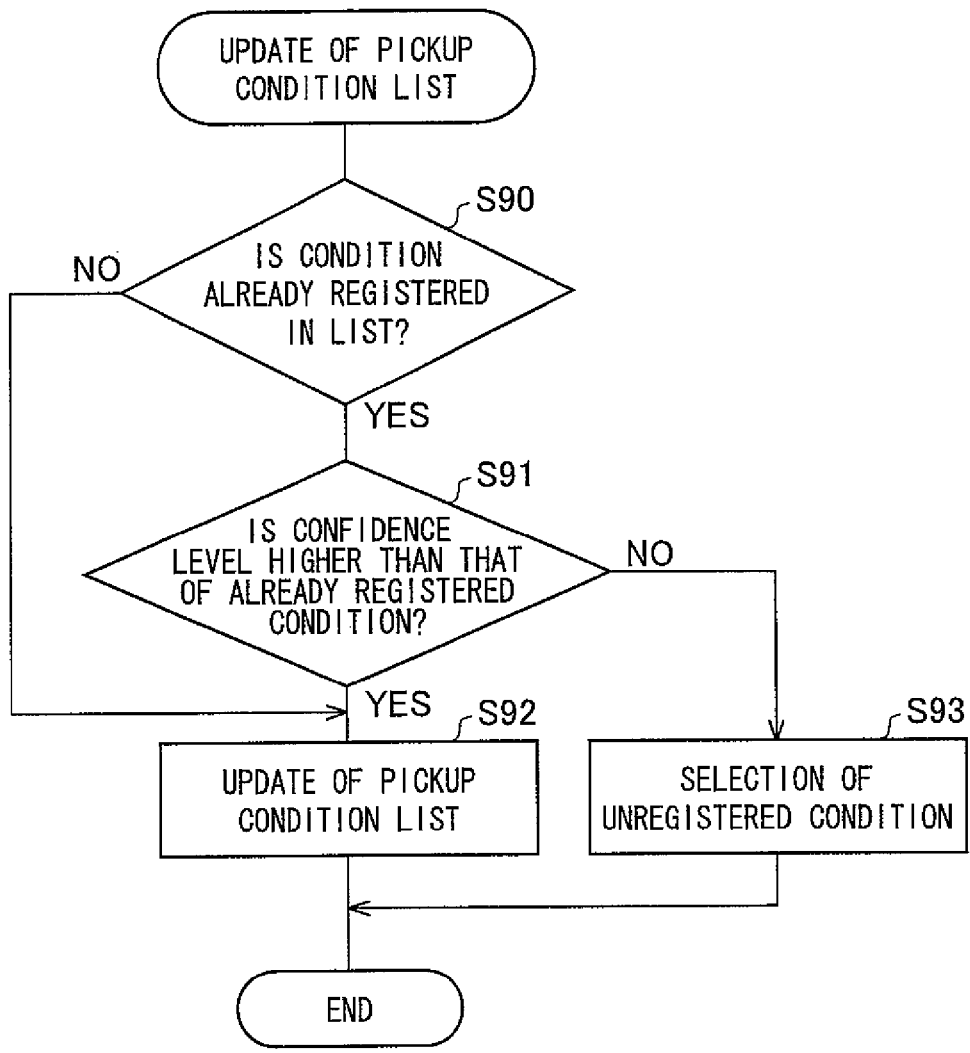
FIG. 9 is a flow chart illustrating a process in which the registration-face-image extracting section updates the pickup condition list.

The following describes, with reference to FIG. 9, a process for updating the pickup condition list 50. The process is carried out by the registration-face-image extracting section 13 in Step S88. FIG. 9 is a flow chart illustrating a process in which the registration-face-image extracting section 13 updates a pickup condition list.

Firstly, the registration-face-image extracting section 13 judges whether or not a pickup condition judged to be satisfied by a face image which is selected is already registered in the pickup condition list 50 (Step S90). Specifically, the registration-face-image extracting section 13 judges whether or not a flag is set for the pickup condition in the pickup condition list 50.

[Comparison in Recognition Confidence Level]

When the judgment result is "false" (NO) in Step S90, the pickup condition list 50 is updated. Specifically, a flag is set for the pickup condition judged to be satisfied by the face image.

On the other hand, in a case where the judgment result is "true" (YES) in Step S90, a flag is already set for the pickup condition. That is, the face image satisfying the pickup condition is already registered in the face-image dictionary 15. The registration-face-image extracting section 13 compares in recognition confidence level between (i) the face image which is already registered and (ii) the face image which is newly extracted. Based on this comparison, the registration-face-image extracting section 13 judges whether or not the face image which is newly extracted is higher in the recognition confidence level than the face image which is already registered (Step S91).

The "recognition confidence level" herein means a value obtained by digitalizing the degree how much a face image satisfies a pickup condition. The registration-face-image extracting section 13 registers, in the pickup condition list 50, a value which is obtained (e.g., 5 degrees or 8 degrees for "the direction of a face") in association with a pickup condition. Alternatively, the registration-face-image extracting section 13 may register, in the face-image dictionary 15, the value in association with a registration face image.

When the judgment result is "true" (YES) in Step S90, the registration-face-image extracting section 13 updates the pickup condition list 50. At this time, a flag is already set in the pickup condition list 50. The flag indicates that the face image satisfying the pickup condition is registered in the face-image dictionary 15. The flag is maintained. The recognition confidence level of the face image which is already registered is replaced with the recognition confidence level of the face image which is newly extracted. After that, the face-image registration section 14 replaces the face image which is already registered in the face-image dictionary 15 with the face image which is newly extracted by the registration-face-image extracting section 13.

This process makes it possible to register, in a face-image dictionary 15, a face image having higher recognition accuracy. This further enhances the recognition accuracy of a face-image dictionary 15 created by a face-image registration device 1.

[Registration of Face Images of a Plurality of Persons]

In the embodiment described so far, a user selects one person out of persons shown in a plurality of representative face images, and the face-image registration device 1 extracts a registration face image of the one person. Then, the face-image registration device 1 registers, in the face-image dictionary 15, the registration face image thus extracted. Alternatively, in order to extract a face image suitable for registration from one moving image or one scene, the face-image registration device 1 may extract registration face images of a plurality of persons and registers, in the face-image dictionary 15, the face images thus extracted one after another.

Figure 10:
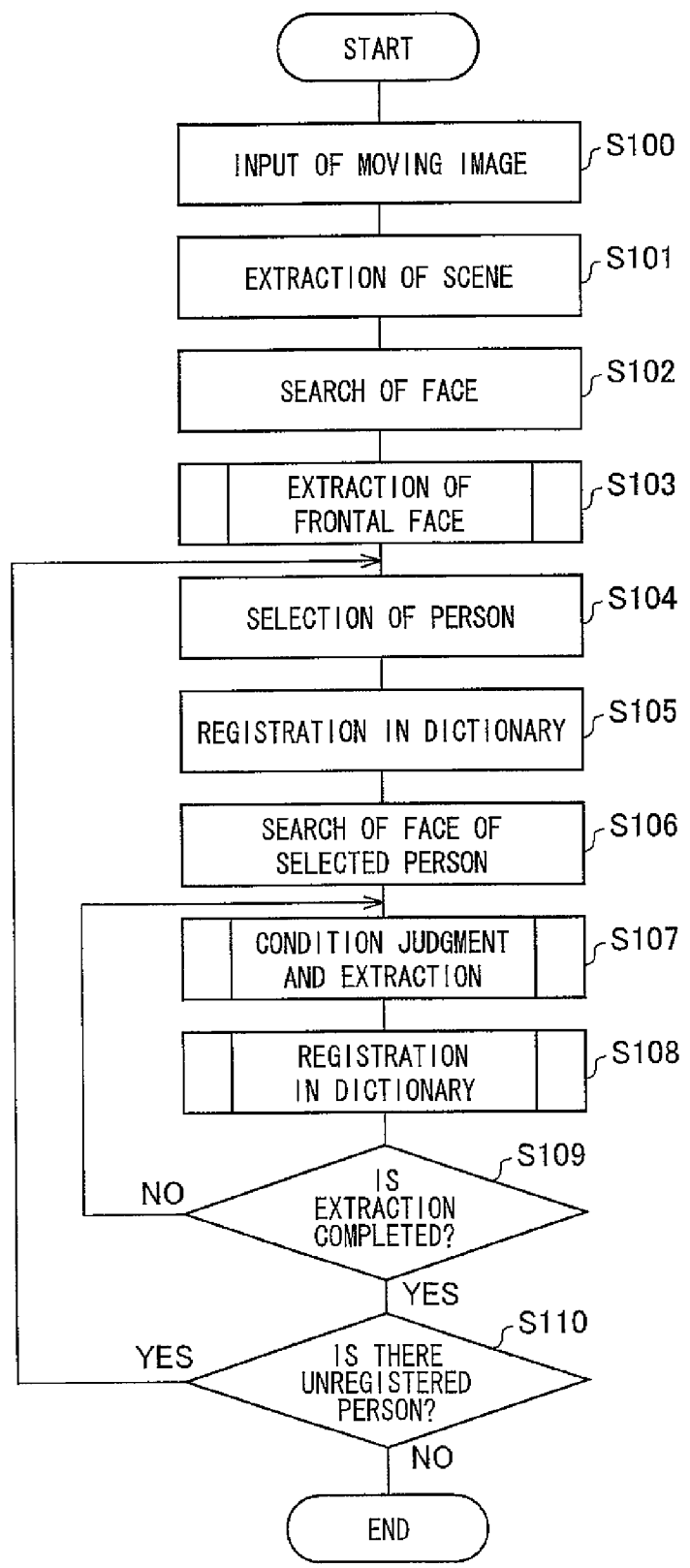
FIG. 10 is a flow chart illustrating a process in which the face-image registration device extracts a face image of a plurality of persons and registers, in the face-image dictionary, the face images thus extracted.

FIG. 10 is a flow chart illustrating a process in which the face-image registration device 1 extracts face images of a plurality of persons and registers, in the face-image dictionary 15, the face images thus extracted.

The process carried out in Step S100 through Step S109 illustrated in FIG. 10 is substantially the same as the process carried out in Step S20 through Step S29. Therefore, the detailed description of the process carried out in Step S100 through Step S109 is omitted here. In Step S104, the display processing section 17 sets, in a memory (not illustrated), a flag indicating that a person selected by a user is already selected.

When it is judged that the extraction of a registration face image of a certain person is completed (YES) in Step S109, the registration-face-image extracting section 13 judges whether or not the persons in the representative face images showed to the user include a person whose face image is not registered in the face-image dictionary 15 yet (i.e., a person whose face image has not been processed yet) (Step S110). Specifically, the registration-face-image extracting section 13 judges whether or not the representative face images include a face image for which a flag is not set.

When the judgment result is "true" (YES) in Step S110, the procedure in FIG. 10 returns to Step S104. The face-image registration device 1 requests the user to select, out of the representative face images displayed on the display device 3, a representative face image which is not registered. At this time, the face image which has been already selected may be displayed in a gray scale. This allows the user to easily distinguish the face image which has not been selected yet from the face image which has been already selected.

The user selects one representative face image which has not been selected. Based on this selection, the registration-face-image extracting section 13 extracts, from the scene, a registration face image of the person shown in the representative face image thus newly selected. Then, the face-image registration section 14 registers, in the face-image dictionary 15, the registration face image which is selected by the registration-face-image extracting section 13.

The face-image registration device 1 repeatedly carries out this process until (i) all of the representative face images are selected and no representative face image to be selected remains or (ii) the user clearly gives a command for stopping the registration process.

[Functions and Effects]

A moving image does not always contain one person, but often contains a large number of people. In light of this, when a plurality of different representative face images are extracted by the representative-face-image extracting section 12, the registration-face-image extracting section 13 extracts a registration face image for each of the representative face images thus extracted. The "plurality of different representative face images" herein mean a plurality of face images respectively showing faces of different persons. At this time, the registration-face-image extracting section 13 extracts a registration face image for each of the different persons.

In a case where a moving image contains a plurality of persons, the face-image registration section 14 registers, in the face-image dictionary 15, the registration face image for each of the plurality of persons in association with the representative face image. Consequently, the face-image dictionary 15 stores the face images of the plurality of different persons.

With this process, it is possible for the face-image registration device 1 to have the face-image dictionary 15 having a further increased amount of face images.

[One Example of Dictionary Data]

Figure 11:
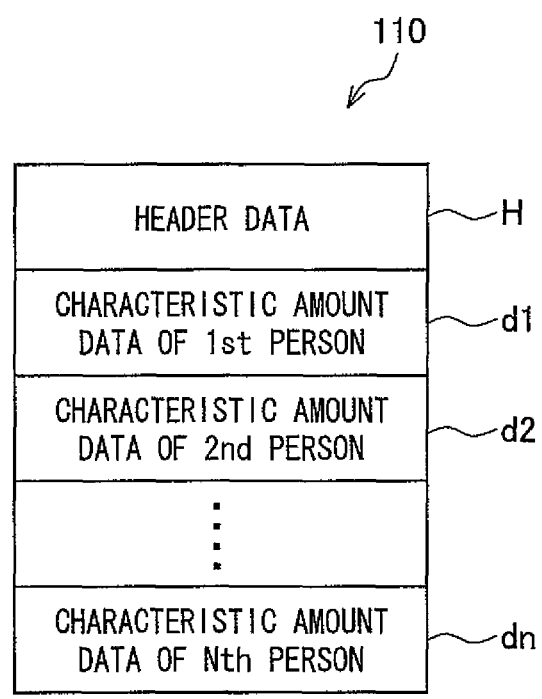
FIG. 11 is a view illustrating one example of dictionary data stored in the face-image dictionary.

The following describes, with reference to FIG. 11, one example of dictionary data stored in the face-image dictionary 15, the dictionary data being created by the face-image registration device 1. FIG. 11 is a view illustrating one example of dictionary data stored in the face-image dictionary 15.

As illustrated in FIG. 11, dictionary data created by the face-image registration device 1 includes header data H, characteristic amount data d1, characteristic amount data d2, . . . , and characteristic amount data dn. The header data H includes various types of definition data related to the whole dictionary data. Examples of the definition data encompass: version information of the face-image dictionary 15; and the number of persons registered in the face-image dictionary 15. Each piece of characteristic amount data di (i=1, 2, . . . , n) represents a characteristic amount worked out for each person shown in a representative face image extracted from a moving image by the representative-face-image extracting section 12. Characteristic amounts worked out for one person are not separately registered, but are registered in a combined form.

[Use of Face-Image Dictionary 15]

As described above, the face-image registration device 1 does not extract a face image satisfying a certain pickup condition by comparing between: a template image satisfying the certain pickup condition; and a face image contained in a moving image. Instead, the face-image registration device 1 extracts face images respectively satisfying pickup conditions which are registered, and works out characteristic amounts in accordance with the face images thus extracted. Then, the face-image registration device 1 combines, into one, the characteristic amounts thus worked out, thereby creating a face-image dictionary 15. This makes it possible to create a face-image dictionary 15 capable of responding to various situations, compared with the use of a registered condition.

The face-image dictionary 15 thus created by the face-image registration device 1 is used by various types of recognition devices. For example, a recognition device extracts a photograph showing a certain person from a large amount of still images which are given. Also, it is possible to use the face-image dictionary 15 so as to recognize the person, thereby improving recognition accuracy. Further, it is possible to extract, from a moving image which is inputted thereto, a scene showing a certain person. In any ways, using the face-image dictionary 15 having higher accuracy than a conventional one allows more accurate recognition of a face image, compared with a conventional method.

The present invention is not limited to the description of the embodiments above, but may be altered by a skilled person within the scope of the claims. An embodiment based on a proper combination of technical means disclosed in different embodiments is encompassed in the technical scope of the present invention.

[Successive Search of Another Scene]

For example, one scene does not always include face images which respectively satisfy all pickup conditions. In light of this, if one scene does not include a necessary registration face image, the registration-face-image extracting section 13 may search in another scene.

At this time, the scene extracting section 11 extracts a plurality of different scenes from a moving image. A partition to be used in this process is, for example, a scene which does not contain a face of a person. If the registration-face-image extracting section 13 does not extract a registration face image from one scene of the plurality of different scenes, the registration-face-image extracting section 13 extracts the registration face image from another scene of the plurality of different scenes. This makes it possible to more surely increase the number of the kinds of face images registered in the face-image dictionary 15.

[Size of Face Image]

The representative-face-image extracting section 12 can extract a representative face image from a scene in such a manner that the representative-face-image extracting section 12 extracts face images having the same size for each person. Consequently, it is possible to stabilize recognition accuracy of a registration face image registered in the face image dictionary 15.

Similarly, the registration-face-image extracting section 13 can extract, from a scene, a registration face image in such a manner that the registration-face-image extracting section 13 extracts face images having the same size for each pickup condition. Consequently, it is possible to stabilize recognition accuracy of a face image for a recognition face image registered in the face image dictionary 15.

[Automatic Selection of Representative Face Image]

The face-image registration device 1 may automatically select a representative face image out of representative face images extracted by the representative-face-image extracting section 12, without requesting a user to select the one. In this case, firstly, the registration-face-image extracting section 13 selects any one of the representative face images which are extracted. Then, the registration-face-image extracting section 13 extracts, from a scene, a registration face image of a person shown in the representative face image thus selected. In this method, it is possible to create a face-image dictionary 15 in a completely automatic way. This does not require a user to carry out troublesome procedures at all.

[Face-Image Registration Program and Storage Medium]

Finally, the blocks included in the face-image registration device 1 may be realized by way of hardware or software as executed by a CPU (Central Processing Unit) as follows:

The face-image registration device 1 includes a CPU and memory devices (memory media). The CPU executes instructions in control programs realizing the functions. The memory devices include a ROM (Read Only Memory) which contains the control programs, a RAM (Random Access Memory) to which the control programs are loaded in a form so as to be executed, and a memory containing the control programs and various data.

With this arrangement, the object of the present invention can also be achieved by using a predetermined storage medium. The storage medium only needs to contain, in a computer-readable way, a control program code (an executable program, an intermediate code program, or a source program) for the face-image registration device 1, which is software realizing the aforementioned functions. This storage medium is provided to the face-image registration device 1. As a result, the face-image registration device 1 realized by a computer (or a CPU, an MPU) may retrieve and execute the program code contained in the storage medium thus provided.

The storage medium providing the program code to the face-image registration device 1 is not limited in a particular structure or type. The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The face-image registration device 1 can attain the object of the present invention by being arranged to be connectable to a communications network. In this case, the program code may be delivered to the face-image registration device 1 over the communications network. The communications network is not limited in any particular type or form, but only needs to deliver the program code to the face-image registration device 1. The communications network may be, for example, the Internet, an intranet, extranet, LAN, ISDN, VAN, CATV communications network, virtual dedicated network (Virtual Private Network), telephone line network, mobile communications network, or satellite communications network.

The transfer medium which makes up the communications network is not limited in any particular structure or type, but only needs to be capable of transferring the program code. The transfer medium may be, for example, wired line, such as IEEE 1394, USB (Universal Serial Bus), electric power line, cable TV line, telephone line, or ADSL (Asymmetric Digital Subscriber Line); or wireless, such as infrared radiation (IrDA, remote control), Bluetooth (Registered Trademark), 802.11 wireless, HDR, mobile telephone network, satellite line, or terrestrial digital network. The present invention encompasses a computer data signal included in a carrier wave in which the program code is embodied electronically.

As described above, a face-image registration device in accordance with the present invention includes face-image registration means for registering, in a dictionary, a registration face image in association with a representative face image, the registration face image and the representative face image being extracted from a moving image. This makes it possible to register various face images in a dictionary, without requesting a user to carry out troublesome procedures.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be widely used as a face-image registration device for creating a face-image dictionary to be used by various types of recognition devices which recognize a face image of a person.

The invention claimed is:

1. A face-image registration device that extracts, from a moving image which is inputted thereto, wherein the moving image comprises a sequence of images, a face image showing a face of a person and registers the face image in a dictionary, the face-image registration device comprising:
representative-face-image extracting means for extracting, from the sequence of images, at least one face image which satisfies a predetermined representative condition, so as to obtain a representative face image,
wherein the sequence of images with respect to the representative face image is an input of the representative-face-image extracting means of the face-image registration device;

registration-face-image extracting means for extracting, from the sequence of images, at least one face image which shows the person shown in the representative face image but is not the representative face image and which satisfies a predetermined registration condition, so as to obtain a registration face image,
  wherein the sequence of images with respect to the registration face image is an input of the registration-face-image extracting means of the face-image registration device, and
  wherein the registration-face-image extracting means does not generate the registration face image from the representative face image, but extracts the registration face image directly from the sequence of images, independently of the representative face image; and
face-image registration means for registering, in the dictionary, the registration face image in association with the representative face image,
  wherein the registration-face-image extracting means selects, from a plurality of predetermined registration conditions different from each other, the predetermined registration condition which a face image that has not been registered in the dictionary satisfies, and determines whether or not a face image searched from the sequence of images satisfies the predetermined registration condition thus selected, and
  wherein the face-image registration means automatically registers, in the dictionary, as the registration face image, the face image thus searched, in a case where the registration-face-image extracting means determines that the face image thus searched satisfies the predetermined registration condition thus selected.

2. The face-image registration device as set forth in claim 1, wherein:
  the face-image registration means registers, in the dictionary, a characteristic amount obtained by digitalizing a characteristic of the registration face image.

3. The face-image registration device as set forth in claim 1, wherein if a plurality of registration conditions different from each other are predetermined, the registration-face-image extracting means extracts at least one registration face image for each of the plurality of registration conditions which registration face image satisfies the registration condition, and
  wherein the face-image registration means registers, in the dictionary, all of the registration face images in association with the representative face image, the registration face images being respectively extracted for each of the registration conditions.

4. The face-image registration device as set forth in claim 3, wherein if the plurality of registration conditions different from each other are predetermined, the face-image registration means extracts one registration face image for each of the plurality of registration conditions which registration face image satisfies the registration condition, and
  wherein the registration-face-image extracting means registers, in the dictionary, all of the registration face images in association with the representative face image, the registration face images being respectively extracted for each of the registration conditions.

5. The face-image registration device as set forth in claim 1, wherein:
  the representative-face-image extracting means extracts a plurality of representative face images different from each other, and the registration-face-image extracting means extracts the registration face image for each of the plurality of representative face images.

6. The face-image registration device as set forth in claim 1, further comprising scene extracting means for extracting a scene from the sequence of images,
  wherein the representative-face-image extracting means extracts the representative face image from the scene, and
  wherein the registration-face-image extracting means extracts the registration face image from the scene.

7. The face-image registration device as set forth in claim 6, wherein the scene extracting means extracts, from the sequence of images, a plurality of scenes different from each other, and
  wherein if the registration-face-image extracting means does not extract the registration face image from one of the scenes, the registration-face-image extracting means extracts the registration face image from another one of the scenes.

8. The face-image registration device as set forth in claim 1, wherein if one registration face image which satisfies a certain registration condition is already registered in the dictionary, the registration-face-image extracting means extracts another registration face image which satisfies the certain registration condition,
  wherein if the another registration face image is higher in recognition confidence level than the one registration face image, the face-image registration means replace the one registration face image with the another registration face image, and
  wherein if the one registration face image which satisfies the certain registration condition is not already registered in the dictionary, which one registration face image has been extracted by the registration-face-image extracting means, the face-image registration means registers the one registration face image thus extracted in the dictionary.

9. A face-image registration method for extracting, from a moving image which is inputted thereto, wherein the moving image comprises a sequence of images, a face image showing a face of a person and for registering the face image in a dictionary, the method comprising:
  a representative-face-image extracting step of extracting, from the sequence of images, at least one face image which satisfies a predetermined representative condition, so as to obtain a representative face image,
  wherein the sequence of images with respect to the representative face image is an input of the representative-face-image extracting step of the face-image registration method;
  a registration-face-image extracting step of extracting, from the sequence of images, at least one face image which shows the person shown in the representative face image but is not the representative face image and which satisfies a predetermined registration condition, so as to obtain a registration face image,
    wherein the sequence of images with respect to the registration face image is an input of the registration-face-image extracting step of the face-image registration method, and
    wherein in the registration-face-image extracting step, the registration face image is not generated from the representative face image, but is extracted directly from the sequence of images, independently of the representative face image; and a face-image registration step of registering, in the dictionary, the registration face image in association with the representative face image, wherein the registration-face-image extracting step further comprises selecting, from a plurality of predetermined registration conditions different from each other, the predetermined registration condition which a face image that has not been registered in the dictionary satisfies, and determining whether or not a face image searched from the sequence of images satisfies the predetermined registration condition thus selected, and wherein the face-image registration step further comprises automatically registering in the dictionary the face image thus searched as the registration face image, after determining, in the registration-face-image extracting step, that the face image thus searched satisfies the predetermined registration condition thus selected.

10. A non-transitory tangible computer-readable storage medium in which a face-image registration program for operating a face-image registration device that extracts, from a moving image which is inputted thereto, wherein the moving image comprises a sequence of images, a face image showing a face of a person and registers the face image in a dictionary, the face-image registration device comprising:

representative-face-image extracting means for extracting, from the sequence of images, at least one face image which satisfies a predetermined representative condition, so as to obtain a representative face image, wherein the sequence of images with respect to the representative face image is an input of the representative-face-image extracting means of the face-image registration device;

registration-face-image extracting means for extracting, from the sequence of images, at least one face image which shows the person shown in the representative face image but is not the representative face image and which satisfies a predetermined registration condition, so as to obtain a registration face image, wherein the sequence of images with respect to the registration face image is an input of the registration-face-image extracting means of the face-image registration device, and wherein the registration-face-image extracting means does not generate the registration face image from the representative face image, but extracts the registration face image directly from the sequence of images, independently of the representative face image; and face-image registration means for registering, in the dictionary, the registration face image in association with the representative face image, wherein the registration-face-image extracting means selects, from a plurality of predetermined registration conditions different from each other, the predetermined registration condition which a face image that has not been registered in the dictionary satisfies, and determines whether or not a face image searched from the sequence of images satisfies the predetermined registration condition thus selected, wherein the face-image registration means automatically registers, in the dictionary, as the registration face image, the face image thus searched, in a case where the registration-face-image extracting means determines that the face image thus searched satisfies the predetermined registration condition thus selected, and wherein the program causes a computer to function as each of the means.

* * * * *